(12) United States Patent
Etzkorn et al.

(10) Patent No.: US 7,659,492 B2
(45) Date of Patent: Feb. 9, 2010

(54) METHOD FOR OPERATING AN ELECTRICAL DEVICE

(75) Inventors: Hans Peter Etzkorn, Bruchsal (DE); Juergen Paul, Stutensee-Buechig (DE); Rolf Merte, Heidelberg (DE)

(73) Assignee: Beru AG, Ludwigsburg (DE)

( * ) Notice: Subject to any disclaimer, the term of this patent is extended or adjusted under 35 U.S.C. 154(b) by 442 days.

(21) Appl. No.: 11/333,534

(22) Filed: Jan. 18, 2006

(65) Prior Publication Data

US 2007/0053131 A1   Mar. 8, 2007

(30) Foreign Application Priority Data

Jan. 18, 2005  (DE) ........................ 10 2005 002 381

(51) Int. Cl.
*H05B 1/02* (2006.01)
(52) U.S. Cl. ........................ 219/482; 219/202; 219/501; 323/901; 323/908
(58) Field of Classification Search ................ 219/494, 219/497, 501, 505, 507–509, 202–206; 323/236, 323/319, 901, 908
See application file for complete search history.

(56) References Cited

U.S. PATENT DOCUMENTS

| | | | | |
|---|---|---|---|---|
| 4,725,713 A | * | 2/1988 | Lehrke | ........................ 392/472 |
| 4,845,342 A | * | 7/1989 | Chen | ........................... 219/501 |
| 5,703,769 A | * | 12/1997 | Murray | ........................... 363/50 |
| 6,003,304 A | * | 12/1999 | Swanson et al. | ............... 60/274 |
| 6,350,968 B1 | * | 2/2002 | Connolly et al. | ............. 219/497 |
| 6,766,962 B2 | * | 7/2004 | Paul et al. | .................. 236/78 D |
| 6,806,445 B2 | * | 10/2004 | Satoh | .......................... 219/482 |
| 6,813,170 B2 | * | 11/2004 | Yang | ........................ 363/56.09 |
| 7,274,007 B2 | * | 9/2007 | Fernandez et al. | ........... 219/497 |
| 7,279,660 B2 | * | 10/2007 | Long et al. | ................... 219/441 |
| 2001/0013512 A1 | | 8/2001 | Eisenhardt et al. | |

FOREIGN PATENT DOCUMENTS

| | | |
|---|---|---|
| CN | 2123838 U | 12/1992 |
| CN | 1069348 A | 2/1993 |
| CN | 1497605 A | 5/2004 |
| DE | 101 09 734 A1 | 9/2002 |
| JP | 2003-291349 A | 10/2003 |

OTHER PUBLICATIONS

State Intellectual Property Office, P.R. China, 2ND Office Action Dated Mar. 13, 2009 for Corrresponding Chinese Patent Application No. 200610059262.0; Entire Document in English.

* cited by examiner

*Primary Examiner*—Mark H Paschall
(74) *Attorney, Agent, or Firm*—David S. Safran; Roberts Mlotkowski Safran & Cole, P.C.

(57) ABSTRACT

A method for operating a device in which typically a very high current is generated when the device is turned on compared to the rated current, e.g. an analogue operated PTC heating device for a mobile device, such as a vehicle, is disclosed. In this method, the power on the device is increased in a defined limited manner or in a ramp-like manner in the connection phase to avoid a high current when the device is switched on.

12 Claims, 3 Drawing Sheets

METHOD FOR OPERATING AN ELECTRICAL DEVICE

BACKGROUND OF THE INVENTION

1. Field of the Invention

The invention relates to a method for operating an electrical device in which a very high current is typically generated when the device is turned on compared to the rated current. In particular, the invention relates to an analogue operated PTC heating device, an electrical pump, an electric motor, a magnetic coil or the like for a mobile device, in particular a vehicle.

2. Description of Related Art

A method is known for equipping mobile means, such as ships, rail vehicles, trucks, commercial vehicles, aircraft, spaceships and motor vehicles with heating devices which heat a flowing medium such as air. Such a device may be used in a vehicle interior heating system, an air heating system for window de-icing, a heating system for preheating the engine intake air, etc.

It is known to provide heating devices in the form of heating elements digitally operated via microprocessor control systems or without an electronic control system, for example on the basis of materials with a positive temperature coefficient of its resistance (PTC) or other heating elements, of metal for example, in which the elements have analogue operation and are switched on and off by means of mechanical relays. Heating elements may be provided in several stages which are switched on by a corresponding number of relays.

In such analogue operated PTC heating devices, a very high current, which may be equal to twice the rated current, flows when the device is switched on, i.e. in a connection phase whose length is of the order of a few seconds. This creates a current load for the power supply mains that is extraordinarily high, which may be considered disadvantageous.

Another problem in these types of devices is that there is no possibility of fault diagnosis, since switching takes place in stages, i.e. in unsteady conditions. Also, these systems involve the use of mechanical relays, causing switching noises. Service life is limited because of the switching cycles, and the operation incurs high costs because mechanical relays are expensive. The cost of wiring is also very high.

Heating systems without an electronic control system, i.e. analogue operated heating devices of the type described above are available on the market from a number of different suppliers.

SUMMARY OF THE INVENTION

One aspect of the invention relates to a method of the type mentioned above which operates by analogue means, i.e. it is not controlled or regulated by microprocessors, and in which the current load in the connection phase is considerably reduced.

This aspect and others can be realized by a method for operating an electric device, comprising providing power to the electric device in the connection phase by increasing the power in a defined limited manner.

Particularly preferred designs and further developments of the method according to the invention include increasing the power after the connection phase with a defined, limited extent over a period of up to 30 seconds, increasing the power in stages, and increasing the power continuously in a ramp-like manner. The device can be operated with pulse width modulation. The pulse width modulation ratio can be increased on the basis of a time delay. Further, at least one of a fault diagnosis and a plausibility test can be carried out based on the pulse width modulation signal.

The electric device can be a heating device wherein the temperature is monitored and the operation is switched off when a predetermined maximum temperature is reached. The electric device can also be any one of an analogue operated PCT heating device, an electric pump, an electric motor, and a magnetic coil. The electric device can be operated in a mobile device such as a vehicle.

Since the power is increased on the basis of a time delay in the connection phase in the method according to the invention, a high surge of current in the connection phase is avoided and the load on the power supply means is reduced.

The method according to the invention has the further advantage that a conditional fault diagnosis and an under-voltage and over-voltage protection can be achieved. In comparison to methods of the prior art for operating a multi-stage heating device, in which individual heating lines are switched on one after the other on a time basis, a homogeneous temperature distribution can be achieved in the heating device because all the heating lines are actuated simultaneously.

Because no mechanical relays are provided for operating the heating device according to the invention, no switching noises are present. Additionally, service life is extended, since there are no mechanical components. The wiring expenditure is substantially reduced, and the costs are reduced.

A particularly preferred embodiment of the method according to the invention is described in greater detail in the following with reference to the associated drawing.

DETAILED DESCRIPTION OF THE INVENTION

Figure 1:
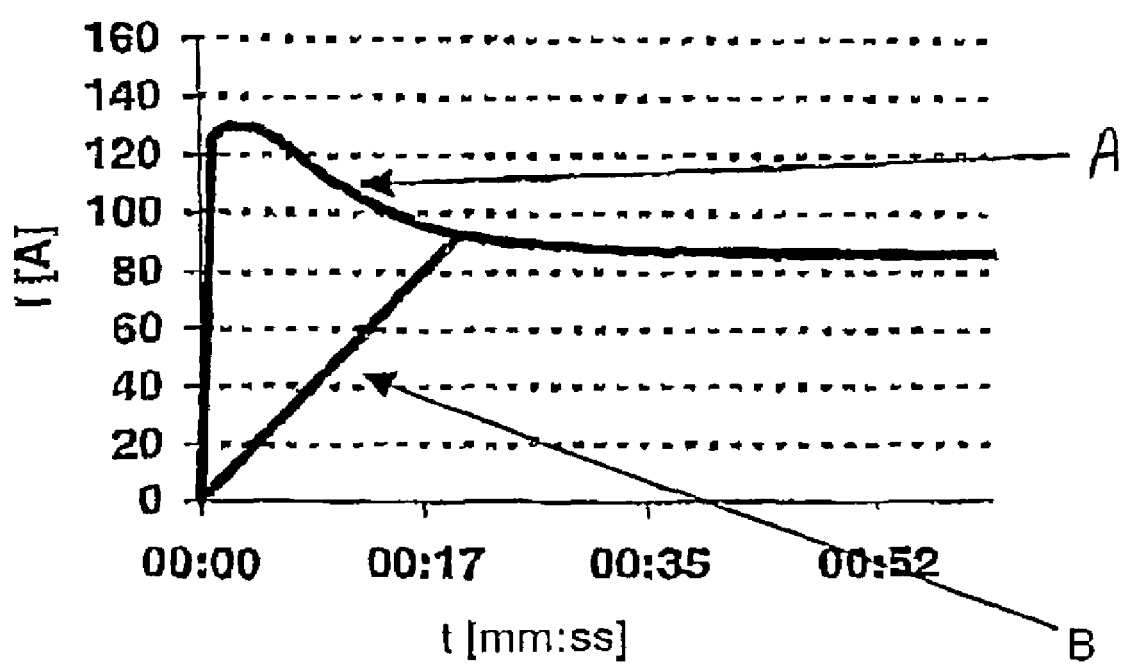
FIG. 1 shows, in a time graph for one stage, the increase in current in a conventional method (curve A) for operating an analogue operated PTC heating device and in the method according to the invention (curve B).

As represented in the FIG. 1, the heating system in a conventional method for operating an analogue operated heating device by means of a mechanical relay with corresponding relay control is switched on in the connection phase so that the current increases sharply in the first few seconds. Here, twice the rated current may flow, which imposes a heavy load on the power supply network. This situation is represented in the drawing by curve A.

In the method according to the invention, a time power delay is provided in the circuit so that the power of the heating device in the connection phase is time delayed or is increased in a defined limited manner. This may take place in stages or in a ramp-like manner, and continuously. This can be achieved, for example, in an operation of the heating device with pulse width modulation (PWM) due a time delayed defined increase in the pulse width modulation ratio. The increase may, for example, be controlled by an integrated resistance-capacity combination.

As represented in FIG. 1, a defined time constant of T=20 s (seconds), for example, may be provided in the circuit so that the heating device does not operate under rated conditions until after this time T. This situation is represented in the associated drawing by curve B. The time constant may be up to 30 s.

Electronic switches are used for the time delayed or defined limited increase in power provided in the method according to the invention. There is also the possibility of fault diagnosis and plausibility testing of the PWM signal.

An under-voltage or over-voltage protection may also be provided and temperature monitoring is possible, with limitation of the maximum temperature and disconnection when this temperature is reached, so that in the case of a heating device for an air-conditioning system, for example, damage is avoided if the ventilation malfunctions. Too high housing flange temperatures may be avoided, even in heating devices for heating flanges for preheating the intake air of a motor vehicle engine.

Figure 2:
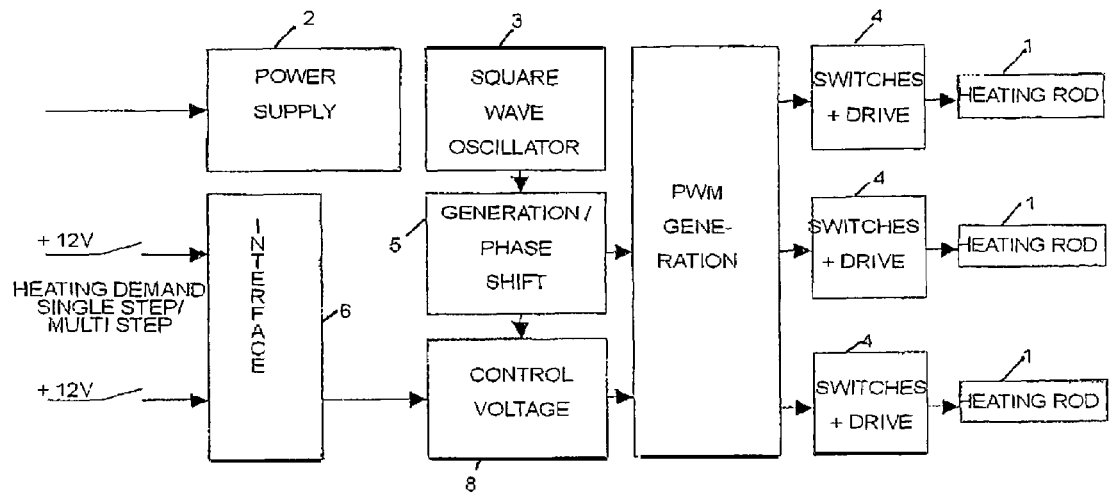
FIG. 2 shows, in a block diagram, the structure of a single or multi-stage electronic control circuit for a PTC heating device.

The single or multi-stage electronic control circuit shown in a block diagram in FIG. 2, for operating a PTC heating device which in the embodiment shown consists of three PTC heating rods 1, comprises a voltage supply 2, which may consist of an integrated adjustable voltage regulator available on the market.

A square wave oscillator or clock oscillator 3 generates a square wave signal which serves to actuate the heating stages by means of the switches and drive 4. Three actuating signals, each with a phase shift of 120°, are formed to reduce the loading of the supply mains by timing these power switches 4 so that they each have a phase shift of 120°. The square wave or clock oscillator 3 may be an analogue clock generator or a digital clock generator.

The phase shift is generated in a block 5, which generates phase displayed actuating signals which serve to reduce the pulse loading of the power mains for operating the heating system. The phase shift may take place digitally.

Depending on the design variant, the heating demand at interface 6 is transmitted to the electronics via a single-wire or two-wire interface. The activation takes place highly actively with 12V, for example, and here low activity activation, i.e. switching to earth, is also possible as a heating signal. The actuation takes place either in only one heating power stage, via a cable, or in several heating stages via two cables, as shown in FIG. 2.

Figure 3:
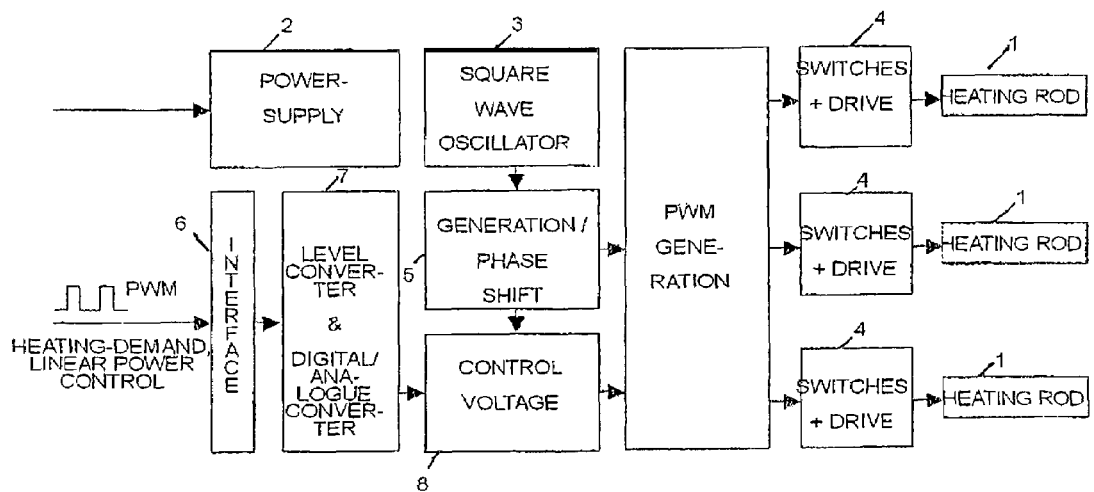
FIG. 3 shows, in a block diagram, the structure of an infinitely variable electronic control circuit for a PTC heating device.

FIG. 3 shows an embodiment which differs from the embodiment of the electronic circuit shown in FIG. 2 in that a PWM predetermined from outside allows a continuous power variation. The PWM predetermined from outside is integrated up by means of an analogue-digital converter 7. The analogue voltage thus generated is then used as a predetermined value for timing the final end phases for heating rods 1. This means that the connection times of the heating stages are varied according to the predetermined PWM. As shown in FIG. 3, a heating demand is provided here in the form of a PWM signal with linear power control.

To generate the PWM for actuating the switches and drive 4, the digital signals, each with a phase shift of 120°, are first modified in block 8. This is done by means of RC low passes, which effect time expansion of the rising edges of the clock signal. A pulse width modulated output signal is obtained by comparing the voltage level of the RC combinations at the inverting input of the operation amplifier with the potential at the non-inverting end.

Figure 4:
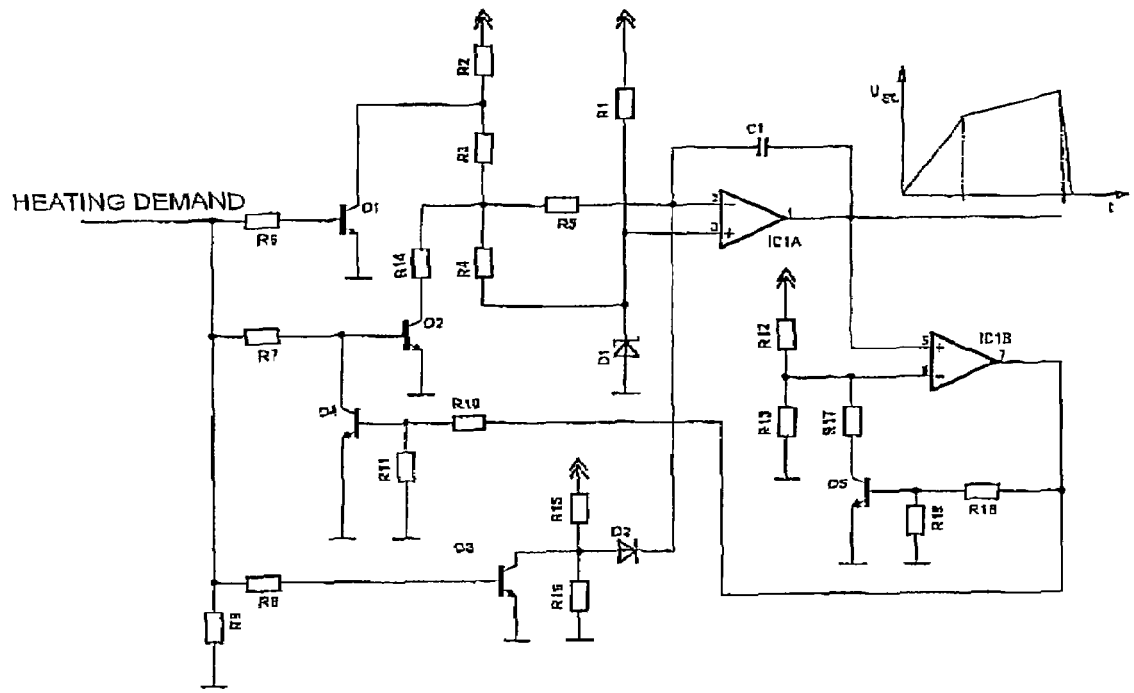
FIG. 4 shows a first embodiment of a circuit arrangement for generating a PWM control voltage for the electronic circuit shown in FIG. 2.

FIG. 4 shows the circuit structure of a first embodiment of a circuit for generating the PWM control voltage for starting the heating system, i.e. for the connection phase of the heating device.

The PWM control voltage is used to increase successively the clock ratio of the PWM in the starting phase of the heating process. To generate a ramp-like course of the PWM control voltage, an inverting integrator is provided as shown in FIG. 4. The steepness of the rise is varied in two stages. In the first stage there is a relatively rapid rise in order to heat the PTC heating device as quickly as possible. Because of a rapid rise in the temperature of heating rods 1, switches 4 are only operated for a short time in the range of the maximum current consumption of the heating device. This results in reduced heating of switches 4.

As shown in FIG. 4, this is achieved by predetermining a voltage to be integrated on resistance R4 when the "heating demand" signal is received. In the second stage, the voltage to be integrated is reduced by comparing the control voltage $U_{St}$ at the output of the IC1A with a freely definable reference potential, which results in a slow rise in control voltage $U_{St}$. When the device is switched off, capacitor C1 of the integrator is quickly charged by the voltage of the divider from resistances R15 and R16. This influences the steepness of the voltage curve during disconnection.

In an embodiment, not shown, the slow rise in control voltage $U_{St}$ can also be achieved by the use of a digital counter in conjunction with a digital analogue conversion.

Figure 5:
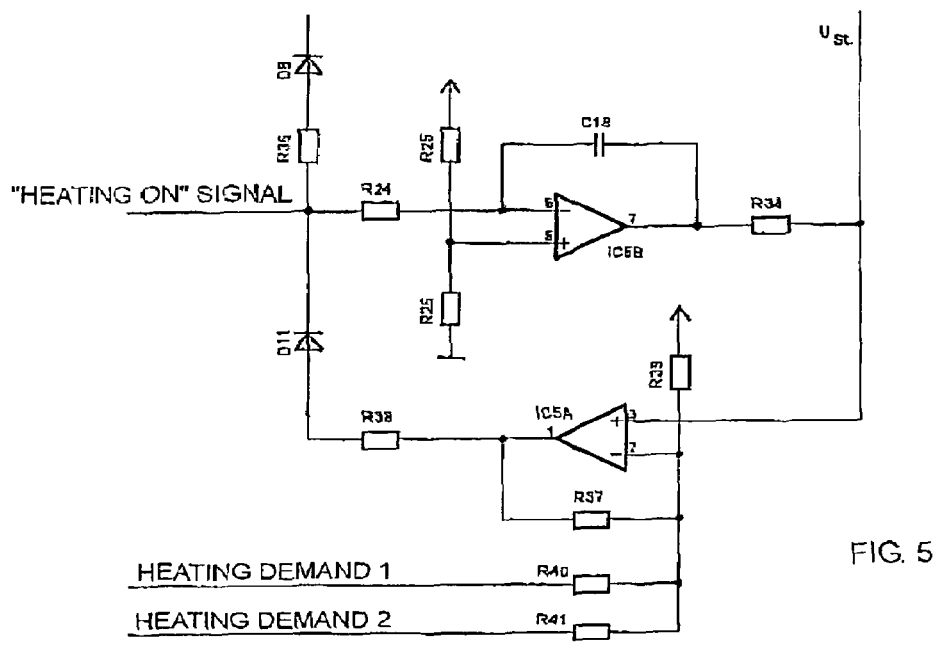
FIG. 5 shows a second embodiment of a circuit arrangement for generating a PWM control voltage for the electronic circuit shown in FIG. 2.

The embodiment shown in FIG. 5 corresponds to a cycled inverting integrator and operates on a similar principle to the embodiment shown in FIG. 4. However, a signal generated by the phase shift logic is here integrated on an IC5B with a clock ratio, as a result of which, unlike the design shown in FIG. 4, the required starting time constant of approx. 30 seconds can be achieved without expensive special components. The IC5A monitors the level of the PWM control voltage $U_{St}$ and limits this according to the existing heating demands. The limiting levels of the control voltage are established by voltage parts R39 and R40 and R39 and R41 respectively.

Although the method according to the invention has been described above with reference to an embodiment of a PTC heating device, it is self-evident that it can also be used for other devices in which a very high current is generated when the device is turned on, compared to the rated current, particularly in electric pumps, electric motors, magnetic coils or the like.

The invention claimed is:

1. A heating device for heating air in a road, rail, air or water vehicle, the heating device comprising:
   a plurality of electric heating elements; and
   a circuit for controlling an initial heating phase of the plurality of electric heating elements by a pulse width modulated (PWM) actuation of each of the plurality of heating elements,
   wherein the circuit is adapted to generate a successively increasing PWM control voltage for increasing a clock ratio of the pulse width modulated actuation,
   wherein the circuit is adapted to increase the PWM control voltage in a course comprising a first stage followed by a second stage,
   wherein the increase of the PWM control voltage in the first stage is more rapid than the increase of the PWM control voltage in the second stage, and wherein the circuit is adapted to phase-shift the pulse width modulated actuations of the plurality of electric heating elements.

2. The heating device of claim 1, wherein the circuit comprises an inverting integrator.

3. The heating device of claim 1, wherein the circuit comprises a digital counter and a digital to analog converter.

4. The heating device of claim 1, wherein the circuit comprises a cycled inverting integrator.

5. The heating device of claim 1, wherein the circuit is adapted to receive heating demands and limit the PWM control voltage according to existing heating demands.

6. A method for controlling an initial heating phase of a heating device for heating air in a road, rail, air or water vehicle, the method comprising the steps of:
   generating pulse width modulated (PWM) and phase-shifted actuation signals for actuating each of a plurality of electric heating elements; and
   generating a successively increasing PWM control voltage for increasing a clock ratio of the pulse width modulated actuation signals,
   wherein the PWM control voltage is increased in a course comprising a first stage followed by a second stage, and
   wherein the increase of the PWM control voltage in the first stage is performed more rapidly than the increase of the PWM control voltage in the second stage.

7. The method of claim 6, wherein the PWM clock ratio is increased in a time delayed manner.

8. The method of claim 6, wherein the PWM control voltage is increased over a period up to 30 seconds.

9. The method of claim 6 wherein the step of increasing the PWM control voltage in the second stage comprises comparing the PWM control voltage with a freely definable reference potential.

10. The method of claim 6 further comprising the step of limiting the PWM control voltage according to existing heating demands.

11. The method of claim 6, further comprising the step of monitoring a temperature of the plurality of heating elements and switching off the heating elements when a predetermined maximum temperature is reached.

12. The method of claim 6 further comprising the step of carrying out at least one of a fault diagnosis and a plausibility test on the basis of the PWM control voltage.

* * * * *